July 8, 1958    D. R. CLEMONS    2,842,653
METHODS OF MAKING ELECTRICAL CAPACITORS
Filed April 9, 1956

INVENTOR
D.R. CLEMONS
BY C.B. Hamilton
ATTORNEY

United States Patent Office 2,842,653
Patented July 8, 1958

2,842,653

METHODS OF MAKING ELECTRICAL CAPACITORS

Dale R. Clemons, Riverside, Ill., assignor to Western Electric Company, Incorporated, New York, N. Y., a corporation of New York Application April 9, 1956, Serial No. 577,132

5 Claims. (Cl. 219—19)

This invention relates to methods of making electrical capacitors, and more particularly to methods of making adjusted electrical capacitors.

An object of this invention is to provide new and improved methods of making adjusted electrical capacitors.

In a method of making adjusted electrical capacitors illustrating certain features of the invention, a plurality of dielectric strips having thereon metallized electrode layers are wound into a spiral roll. As the roll is wound, a plurality of spaced electrical resistance wires are positioned transversely across the dielectric strips. After the roll is wound the capacitance of the roll is adjusted to a predetermined value by applying a voltage to the resistance wires to heat them to vaporize transverse areas of the metallized electrode layers.

Other objects and advantages of the invention will become apparent by reference to the following detailed description and the accompanying drawing illustrating a preferred embodiment of the invention, in which.

Figure 1:
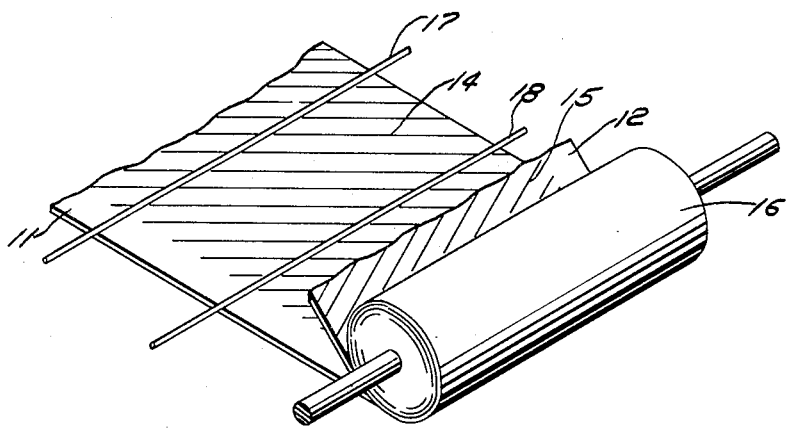
Fig. 1 is a perspective view showing the positioning of the resistance wires transversely across one of the dielectric strips being wound into a roll.
Figure 2:
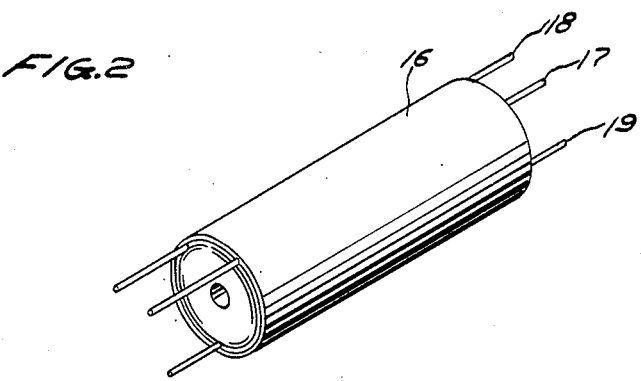
Fig. 2 is a perspective view of the completely wound roll showing the manner in which the resistance wires are positioned in the roll prior to adjustment of the capacitance of the roll.

Referring now in detail to the drawing, a plurality of dielectric strips 11 and 12 having thereon metallized electrode layers 14 and 15 are shown being wound into a roll 16, the dielectric strips 11 and 12 and the electrode layers 14 and 15 being in interleaved relationship. As the roll 16 is wound, a plurality of resistance wires 17, 18 and 19 are positioned transversely across the dielectric strip 11 at spaced intervals from the outer end thereof whereby when the roll 16 is completed the resistance wires extend from the ends thereof as illustrated in Fig. 2.

Figure 3:
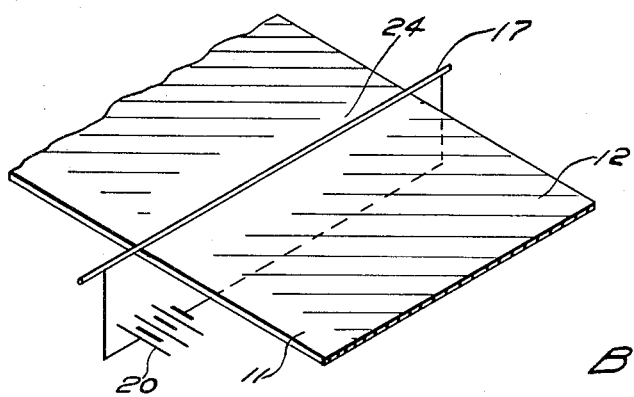
Fig. 3 is a fragmentary perspective view of a portion of one of the dielectric strips showing an area thereon from which the metallized electrode has been evaporated.

With the capacitance value of the roll initially above a predetermined desirable value, electrical current from a source 20 is passed through resistance wire 17, which is the resistance wire nearest the outer end of the dielectric strip 11. The current flowing in the wire 17 heats it to vaporize a transverse area 24 of the metallized electrode layer 14 therefrom as illustrated in Fig. 3, the electrode layer 14 being of a type of metal or alloy which has a low heat of vaporization. That part of the metallized electrode layer 14 between the area 24 and the outer end of the strip 11 is now electrically disconnected from the metallized layer 14, whereby the capacitance of the roll 16 is reduced. The capacitance of the roll 16 is now tested in a well-known manner by a device of a well-known type (not shown) and, if it is still above a desirable value, current from the source 20 is passed through the resistance wire 18, which is the second resistance wire from the outer end of the strip 11, to vaporize more of the metallized layer 14 therefrom to further reduce the resistance of the roll 16 as above described. The above-described operations are continued until the capacitance of the roll 16 is at a predetermined desirable value, whereupon all of the resistance wires are manually pulled out of the roll 16. Terminals of a well-known type (not shown) are then secured to the roll 16 and electrically connected to the metallized electrode layers 14 and 15 or, if it is desirable, any resistance wire which has not been heated by the flow of current therein may be left in the roll 16 to serve as a terminal.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making electrical capacitors comprising assembling a plurality of dielectric layers into a capacitor body, said dielectric layers having thereon thin metal electrode layers, inserting an electrically conductive element into the capacitor body, whereby it traverses one of said electrode layers, and heating the conductive element to vaporize an area of said one electrode layer to reduce the capacitance of the body.

2. The method of making electrical capacitors, comprising assembling a plurality of dielectric layers into a capacitor body, said dielectric layers having thereon metallized electrode layers, inserting an electrical resistance element into the capacitor body whereby it traverses one of said electrode layers, and applying a voltage to the resistance element to heat it whereby a portion of said electrode layer is vaporized from the dielectric layer to reduce the capacitance of the body.

3. The method of making electrical capacitors, comprising winding a plurality of dielectric layers into a roll, said dielectric layers having thereon thin metal electrode layers, inserting a plurality of electrical resistance elements into the roll whereby said elements traverse one of the electrode layers at spaced intervals, and sequentially applying a voltage to said resistance elements whereby transverse areas of said electrode layers are vaporized from the dielectric layer to reduce the capacitance of the roll.

4. The method of making electrical capacitors, comprising positioning a plurality of electrical resistance wires transversely across and at spaced intervals from one end of one of a plurality of electrode layers metallized onto a plurality of dielectric strips, winding the dielectric layers into a roll whereby said dielectric layers and electrode layers are in interleaved relationship, and sequentially applying a voltage to the resistance wires to vaporize transverse areas of said one electrode layer to reduce the capacitance of the roll to a predetermined value, said voltage applying sequence beginning with the resistance wire nearest said one end of the dielectric strip.

5. The method of making electrical capacitors, comprising positioning a plurality of electrical resistance elements transversely across and at spaced intervals from one edge of an electrode layer metallized onto a dielectric layer, juxtaposing said dielectric layer and resistance elements with a plurality of other interleaved dielectric and electrode layers to form a capacitor body, and sequentially applying a voltage to said resistance elements whereby transverse areas of the electrode layer are vaporized from said dielectric layer to reduce the capacitance of the body, said voltage applying sequence beginning with the resistance element nearest said one edge of the electrode layer.

References Cited in the file of this patent

UNITED STATES PATENTS

| 1,796,683 | Carlson | Mar. 17, 1931 |
| 2,697,162 | Quandt | Dec. 14, 1954 |